United States Patent

[11] 3,592,081

| [72] | Inventor | Hans Joachim Schwerdhofer<br>Schweinfurt am Main, Germany |
|---|---|---|
| [21] | Appl. No. | 16,920 |
| [22] | Filed | Mar. 5, 1970 |
| [45] | Patented | July 13, 1971 |
| [73] | Assignee | Fichtel & Sachs AG<br>Schweinfurt am Main, Germany |
| [32] | Priority | Mar. 7, 1969 |
| [33] | | Germany |
| [31] | | P 19 11 548.1 |

[54] MULTIPLE SPEED HUB WITH AUTOMATIC GEAR CHANGE AND MANUAL OVERRIDE
12 Claims, 12 Drawing Figs.

[52] U.S. Cl. .................................................. 74/752 E,
   74/750 B, 192/103 B, 192/114
[51] Int. Cl. .................................................. F16h 5/46,
   F16d 41/00, F16d 45/00
[50] Field of Search ........................................... 74/750 B,
   752 E

[56] References Cited
UNITED STATES PATENTS

| 1,919,876 | 7/1933 | Mielke et al. ............... | 74/752 E |
| 2,132,728 | 10/1938 | Ford et al. .................. | 74/752 E |
| 3,182,529 | 5/1965 | Schwerdhofer ............. | 74/750 B |
| 3,492,893 | 2/1970 | Shimano et al. ............. | 74/752 E |

*Primary Examiner*—Carlton R. Croyle
*Assistant Examiner*—Thomas C. Perry
*Attorney*—Kelman and Berman ABSTRACT: A dual-speed bicycle hub with planetary gearing and automatic gear shift operated by a centrifugal governor is additionally equipped with a manual override permitting manual speed selection while movement of the flyweight in the governor under the influence of centrifugal forces is blocked. The manual controls may shift the otherwise blocked flyweight and thereby act on an overrunning clutch in the transmission or act on a separate clutch while the flyweight is immobilized.

PATENTED JUL 13 1971

3,592,081

MULTIPLE SPEED HUB WITH AUTOMATIC GEAR CHANGE AND MANUAL OVERRIDE

This invention relates to multiple speed hubs for bicycles and like vehicles, and particularly to improvements in a multiple speed hub equipped with a centrifugal governor for automatic changes in its transmission ratio.

In known hubs of the general type described above, the transmission ratio of the hub is changed automatically when the rotary speed of the hub shell or of the hub input member, usually referred to as the driver, exceeds a certain limit or drops below a certain limit. While the advantages of a multiple speed hub with automatic gear change are well established, the operator of the bicycle may wish to retain more control over the transmission ratio than can be had with a centrifugal governor. It may be desirable to retain a low transmission ratio at relatively high-travelling speed for rapid acceleration, or to maintain a high-transmission ratio at relatively low speed as is readily feasible with manual speed-shifting equipment.

Additionally, children and adolescents like their bicycles to be equipped with controls found in motorcars. The ready acceptance of automatic gear changing equipment in bicycles is believed to be due partly to the fact that automobiles are usually so equipped. Sports cars and particularly ordinary cars made to look like sports cars have recently been equipped with dual transmission controls which permit gears to be shifted either automatically or manually. Similar controls are therefore desirable in bicycles intended for young operators.

The primary object of the invention is the provision of a multiple-speed hub for a bicycle or like vehicle which is equipped for automatic gear change and is provided with a manual override.

An additional object is the provision of a bicycle hub with both automatic and manual speed controls which is simple enough to be practical and low in cost.

With these objects in view, the invention provides an improvement in the known multiple speed hub in which a hub shell is mounted for rotation about its axis, and a driver is rotatable about the same axis. A multiple speed transmission is operatively interposed in the hub shell between the driver and the hub shell for rotating the latter at a selected one of a plurality of speeds when the driver rotates at a fixed speed. A centrifugal governor for the hub includes a flyweight which is coupled either to the hub shell or to the driver for simultaneous rotation and for movement transversely to the direction of its rotation in response to a change in the magnitude of centrifugal forces generated by the rotation. The centrifugal governor selects the transmission speed in response to the aforementioned transverse movement of the flyweight.

The invention additionally provides a manual speed selecting mechanism which is connected to the transmission for selecting the output speed. A blocking device is connected to the manual mechanism and responds to the selecting of a speed by the manual speed-selecting mechanism by preventing the transverse movement of the flyweight under the influence of changing centrifugal forces.

Other features, additional objects, and many of the attendant features of this invention will readily become apparent from the following detailed description of preferred embodiments when considered in connection with the appended drawing in which.

Figure 1:
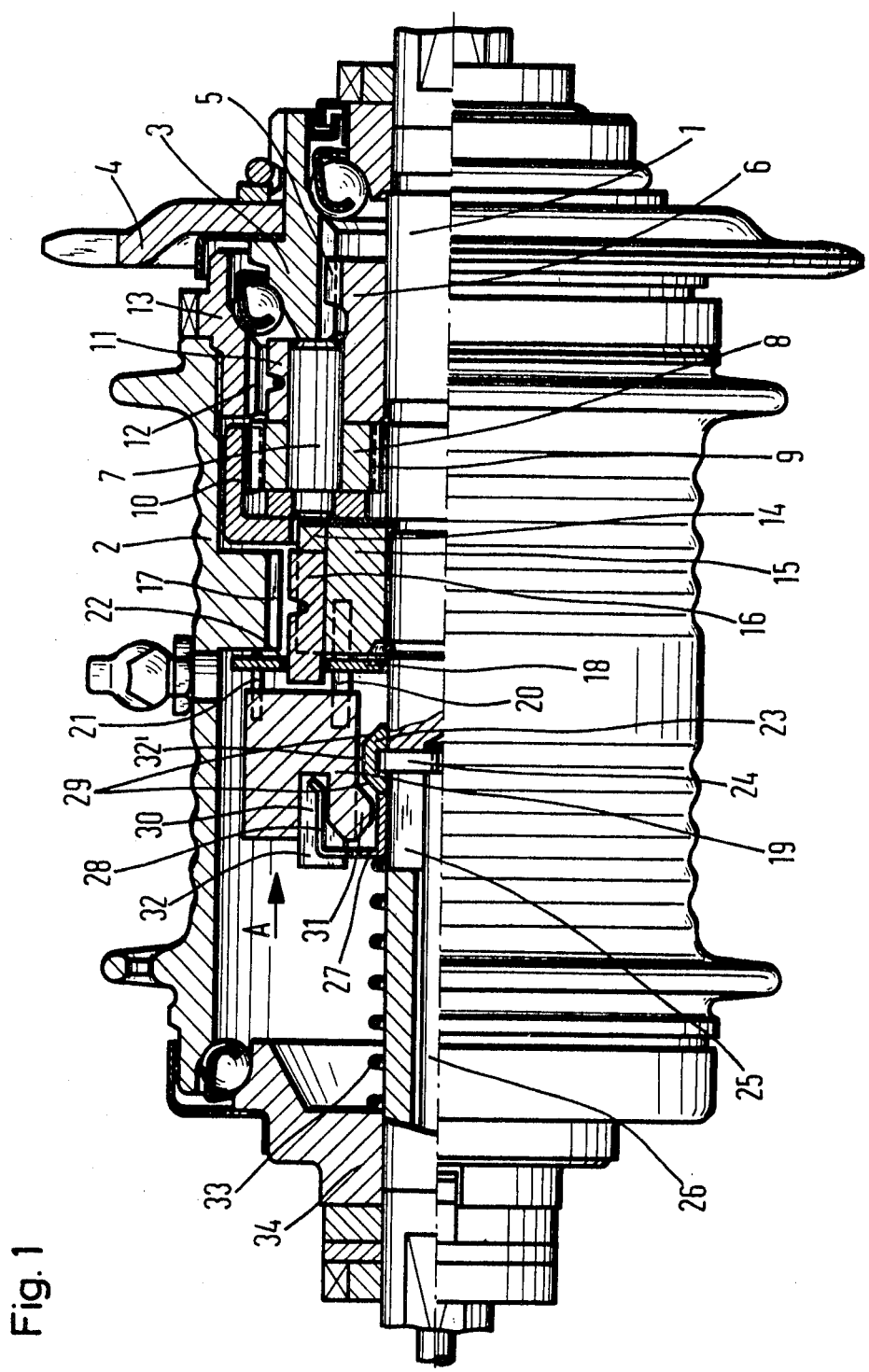
FIG. 1 shows a two-speed bicycle hub of the invention in rear elevation, and partly in section on its axis.

Referring now to the drawing in detail, and initially to FIG. 1, there is seen a two-speed hub of the invention for a bicycle or like vehicle which is equipped with a centrifugal governor for automatic gear shift in response to the pedalling speed, and with an override for manual shift control.

As is conventional, the hub is normally attached to the frame of a bicycle by means of its stationary, partly tubular shaft 1, and nonillustrated wire spokes fasten a wheel rim to a hub shell 2 of approximately cylindrical shape coaxial with the shaft 1. A tubular driver 3 is rotatably mounted on the shaft 1 and axially projects from the shell 2 to carry a drive sprocket 4. Interengaged axial ribs 5 on the portion of the driver 3 received in the hub shell 2 and on a planet carrier 6 connect the driver and carrier for joint rotation in all operative conditions of the hub.

Three planet shafts 7, equiangularly spaced on the carrier 6 about the shaft axis rotatably support respective planet gears 8 which simultaneously mesh with a sun gear 9 fixed on or integral with the shaft 1 and with internal gear teeth on a ring gear 10 having the shape of a cup with apertured bottom.

In the illustrated low-speed condition of the hub, pawls 11 on the planet carrier 6 engage a ratchet rim 12 on a bearing ring 13 which is fixedly attached to the hub shell 2. Interengaged projections and recesses 14 permanently couple the ring gear 10 to a pawl carrier 15 in the assembled hub. Pawls 16 on the carrier 15 are held out of engagement with a ratchet rim 17 on the inner wall of the shell 2 by a radial control disc 18, respective axially projecting portions of the pawls 16 being received in cam openings 22 of the disc 18, the openings being shaped to permit engagement of the pawls 16 with the ratchet rim 17 when the disc 18 is turned about the axis of the hub away from the illustrated position.

Two fly weights 19 are attached to the pawl carrier 15 by pivot pins 20 which pass through oversized apertures in the control disc 18 to permit necessary relative movement of the pins 20 and the disc 18. Axial motion-transmitting pins 21 fixedly mounted on the fly weights 19 respectively engage the disc 18 for turning the same when the flyweights are swung radially outward from the position illustrated in FIG. 1 by centrifugal forces against the restraint of a nonillustrated return spring.

The structure described so far is partly conventional, and partly disclosed in more detail in my copending application Ser. No. 838,524, filed on July 2, 1969.

A ring 23 having the cross-sectional shape of a shallow trough and coaxial with the shaft 1 is axially movable on the shaft. A slide 24 guided in an axial slot 25 of the shaft 1 in the tubular portion of the latter engages the annular groove in the inner face of the ring 23 and is attached to an actuating rod 26 coaxially received in the outwardly open central cavity of the shaft 1. The rod 26 may be pulled axially away from the driver 3 by a nonillustrated Bowden cable connected to a gear shifting mechanism on the handle bar of the bicycle, not itself seen in the drawing, the arrangement being conventional in itself and commonly employed in manually controlled, multiple speed hubs.

A flanged sleeve 27 is axially slidable and rotatable on the shaft 1 and is held in axially abutting engagement with the ring 23 by a helical pressure spring 33 interposed between the flange of the sleeve 27 and a stationary cover 34 which closes the end of the hub shell 2 remote from the driver 3 and carries the hub shell by means of a ball bearing, another ball bearing being arranged between the bearing ring 13 and the driver 3. The spring 33 tends to shift the slide 24 toward the driver 3.

Figure 5:
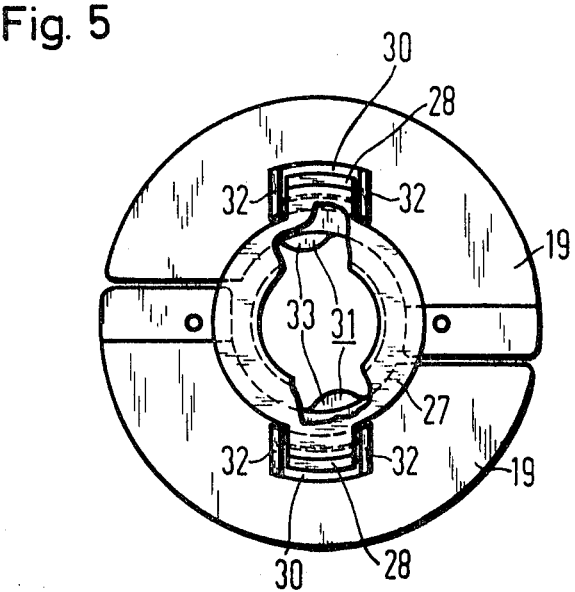
FIG. 5 is a side elevational, fragmentary view of the centrifugal speed governor in the hub of FIG. 1 as seen in the direction of the arrow A.

Lugs 28 axially extend from the flange of the sleeve 27 into recesses 30 of the flyweights 19. The recesses are axially open and circumferentially bounded by walls 32 which axially project beyond the orifices of the recesses 30 as is also shown in FIG. 5. The lugs 28 abut against the walls 32, and the sleeve 27 rotates with the flyweights 19 even when the lugs 28 are withdrawn from the recesses 30, as long as they engage the walls 32.

The outer face of the ring 23 has two oppositely inclined conical portions 29 separated by an approximately cylindrical portion 32'. Projections 31 directed in a radially inward direction from the flyweights 19 respectively have conical abutment faces axially opposite one of the face portions 29 in the condition of the apparatus shown in FIG. 1.

Figure 2:
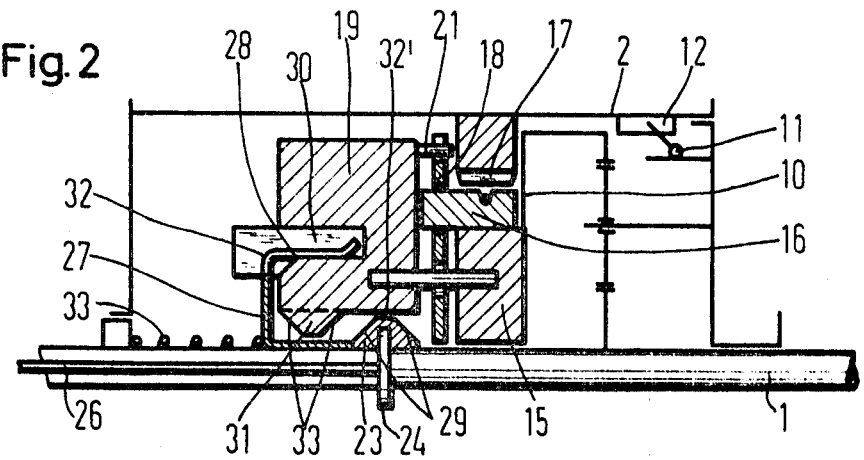
FIG. 2 illustrates one half of the hub of FIG. 1 in a simplified representation using conventional symbols for known hub elements.

When the lugs 28 are received in the recesses 30 of the flyweights, as shown in FIGS. 1 and 2, they retain the flyweights near the shaft 1 regardless of the rotary speed of the ring gear 10 with which they rotate. When the ring 23 is moved into the portion of FIG. 3 in which the ring 23 is radially aligned with the projections 31, the ring face 32' holds the flyweights 19 remote from the shaft 1 regardless of their rotary speed. When the ring 23 is pulled beyond the projections 31 away from the driver 3, as is shown in FIG. 4, the flyweights are free to move toward and away from the shaft 1 in response to centrifugal forces and the restraint of their nonillustrated return spring. The ring 23 is shifted between the positions of FIGS. 1, 2, and 3 by means of the aforementioned actuating mechanism on the handlebars of the bicycle which, of course, may also be located anywhere else on the vehicle, and may be operated by foot instead of by hand, as is known in itself and not directly relevant to this invention.

The aforedescribed apparatus is operated as follows:

In the condition of the hub shown in FIGS. 1 and 2, the sleeve 27 and the ring 23 are pushed by the spring 33 as far to the right as the slot 25 permits the slide 24 to move. The flyweights 19 are blocked in a position in which they prevent engagement of the pawls 16 with the ratchet rim 17. The pawl carrier 15 and the pawls 16 turn idly at the speed of the ring gear 10. Power is transmitted from the sprocket 4 to the hub shell 2 by the driver 3, the planet carrier 6, the pawls 11, and the bearing ring 13. The hub shell rotates at the same speed as the sprocket 4.

Figure 3:
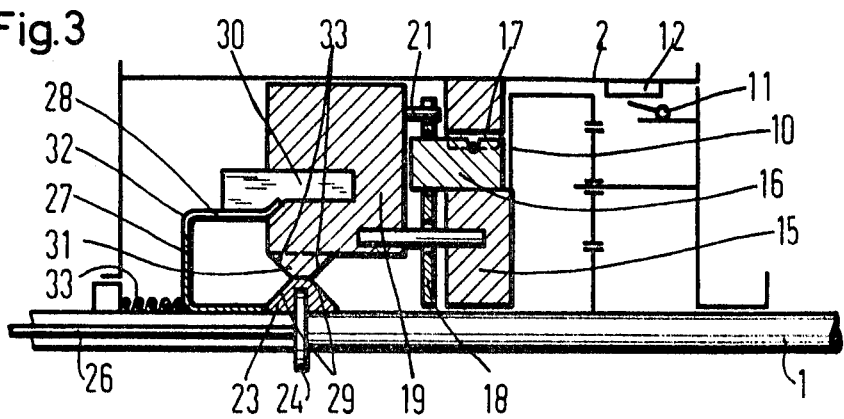
FIGS. 3 and 4 show the hub in the manner of FIG. 2 in different operating positions.
Figure 4:
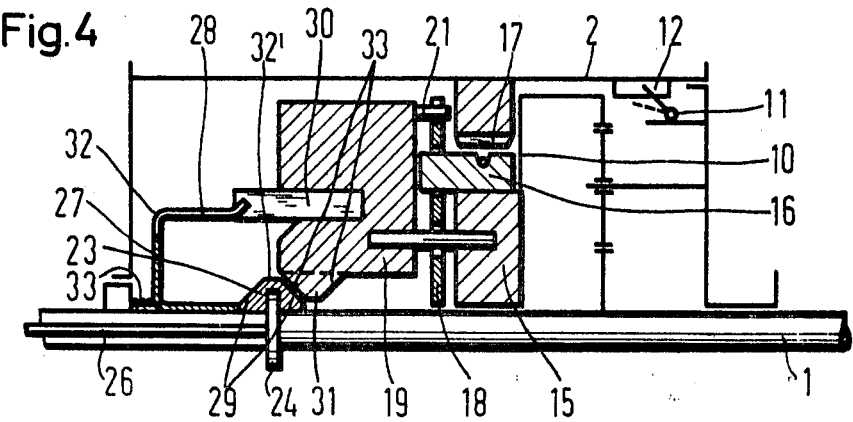

In the condition illustrated in FIG. 3, the ring 23 is held against the urging of the spring 33 by the nonillustrated actuating mechanism. The lugs 28 are sufficiently withdrawn from the recesses 30 to release the flyweights 19, and the latter are moved away from the shaft 1 by the ring 23, whereby the pawls 16 are engaged with the gear rim 17. Torque is transmitted from the sprocket 4 to the hub shell 2 by the driver 3, the planet carrier 6, the planet gears 8, the ring gear 10, and the overrunning clutch constituted by the pawls 16 and the gear rim 17. The hub shell 2 rotates at the speed of the ring gear 10 which is higher than the input speed of the sprocket 4. The ratchet rim 12 on the bearing ring 13 overtravels the slower moving pawls 11.

The two conditions shown in FIGS. 2 and 3 respectively may be set manually by means of the actuating mechanism partly represented in the drawing by the rod 26 and the slide 24. The automatic centrifugal governor is ineffective.

When the ring 23 is in the position shown in FIG. 5, the transmission ratio of the hub is changed automatically in response to changes in the rotary speed of the planetary gearing, more specifically of the ring gear 10. When the speed of the ring gear is insufficient to generate centrifugal forces acting on the flyweights 19 that could overcome the restraint of the non illustrated return spring, the flyweights remain in the position of FIG. 4, and the hub shell 2 rotates at the speed of the input sprocket. When the pedalling speed is increased sufficiently, the flyweights are moved by centrifugal forces into the position shown in FIG. 3, and the hub shell 2 rotates at the speed of the ring gear 10.

The ring 23 is moved between the positions shown in FIGS. 2 to 4 in a direction from the right to the left by tension in the nonillustrated Bowden cable, and from the left to the right by the force of the spring 33. The lugs 28 are held aligned with the recesses 30 of the flyweights 19 by the walls 32 of the latter, and the free ends of the lugs are obliquely inclined relative to the axis of the shaft for camming engagement with a similarly oblique face of each flyweight at the orifice of the recess 30 to return the flyweights toward the axis of the shaft 1 when the sleeve 27 moves into the position of FIG. 2.

The modified two-speed hub shown in FIGS. 6 to 10 has the same shaft, hub shell, and planetary gearing as described above with reference to FIGS. 1 to 5. Power may be transmitted directly between the input assembly of the hub and the hub shell by an overrunning clutch 11, 12. The ring gear 10 carries two pivotally mounted flyweights 19', and a manual gear shifting mechanism is provided as in FIGS. 1 to 5.

Figure 10:
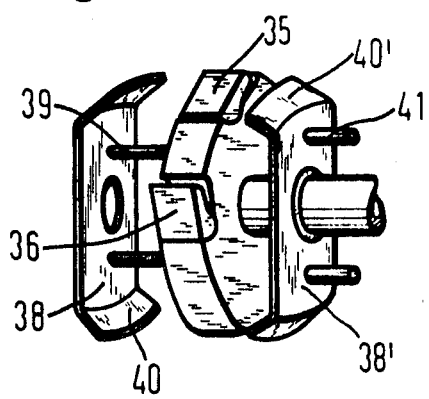
FIG. 10 is a perspective, exploded view of a portion of the device of FIG. 9.

The manual mechanism and the flyweights 19' control separate overrunning clutches including respective pairs of diametrically opposite pawls 35, 36, best seen in FIG. 10, and mounted on a common pawl carrier 37 in rectangularly offset relationship in a common radial plane. Pawl springs bias the pawls 35, 36 toward engagement with the common ratchet rim 17 on the hub shell 2, as is conventional. The pawls 35 are controlled or operated by a cage assembly consisting of two diametrically elongated plates 38, 38' on opposite axial sides of the pawl carrier 37 and fixedly connected by axial rods 39 which are slidably guided in axial bores of the pawl carrier. The radial end portions 40, 40' of the plates 38, 38' are angularly offset toward each other and conically curved about the hub axis. They are axially aligned with the pawls 35 and sufficiently spaced from each other that they may be disengaged from the pawls simultaneously, as is shown in FIG. 7.

Figure 6:
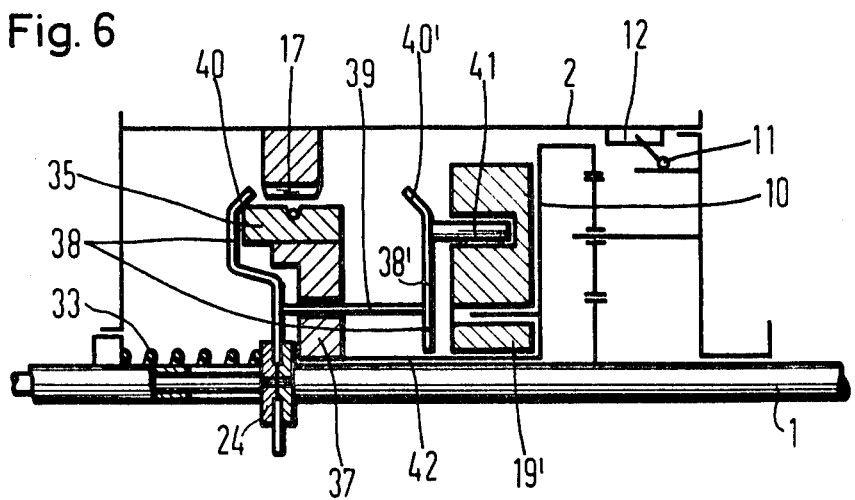
FIGS. 6 and 8 show a second embodiment of the invention in the manner of FIG. 2 and in different respective operating positions.
Figure 7:
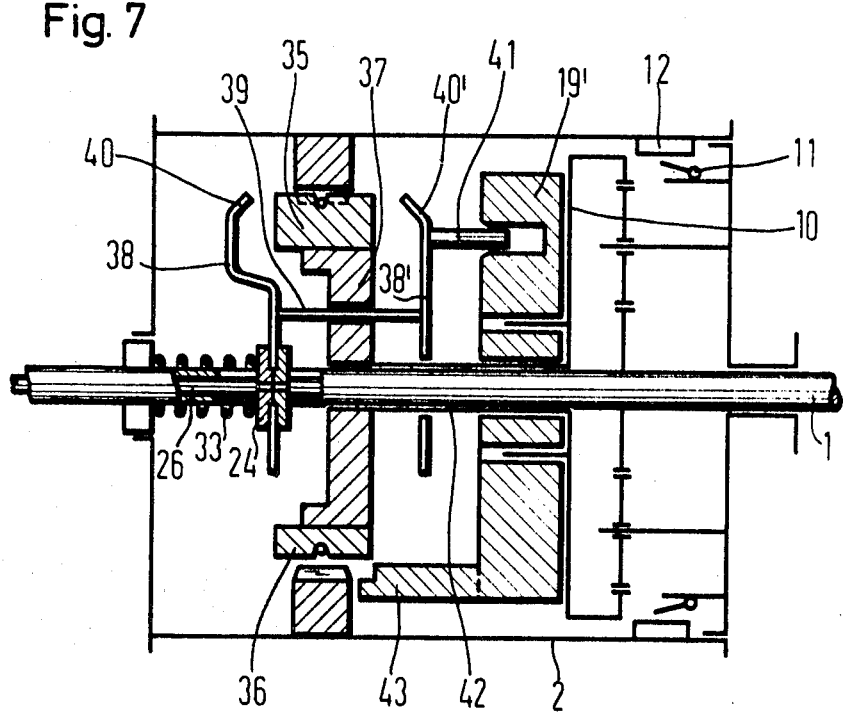
FIG. 7 illustrates the hub of FIG. 6 partly in elevational and partly in plan section and in yet another operating position.

The plate 38' which is arranged axially between the pawl carrier 37 and the flyweights 19' carries two axial locking pins 41 which respectively engage axially open recesses in the flyweights in the condition of the apparatus seen in FIGS. 6 and 7. The plate 38 is fixedly mounted on the slide 24 so that the cage assembly may be shifted manually between the three positions seen in FIGS. 6, 7, and 8.

As is shown in FIG. 6, the end portions 40 of the plate 38 withdraw the pawls 35 from the ratchet rim 17 when the slide 24 is moved farthest toward the input end of the hub, as in FIGS. 1 and 2. The pins 41 engage the flyweights 19' and hold the flyweights near the hub shaft, thereby also disengaging the pawls 36, as will presently be described. Torque is transmitted directly from the hub input to the hub shell by the overrunning clutch 11, 12, and this condition is maintained regardless of the rotary speed of the blocked flyweights 19'.

When the slide 24 is shifted toward the left and held in an intermediate position shown in FIG. 7 and corresponding to that illustrated in FIG. 3, the plates 38, 38' are both remote from the pawls 35, and the latter can engage the ratchet rim 17 under the urging of their pawl springs. The hub shell 2 turns at the higher speed of the ring gear to which the pawl carrier 37 is fixedly connected by a sleeve 42 rotating on the hub shaft. The pins 41 are only partly withdrawn from the flyweights 19', the latter are blocked near the hub shaft, and arms 43 on the flyweights retain the pawls 36 in the inoperative condition, as shown in FIG. 7.

When the slide 24 is shifted toward the end of its stroke remote from the hub input, the end portion 40' of the plate 38' holds the pawls 35 out of engagement with the ratchet rim 17, and the pins 41 are fully withdrawn from the flyweights 19'. The transmission ratio of the hub is determined by the rotary speed of the ring gear 10 and the resulting centrifugal forces acting on the flyweights 19' in opposition to their nonillustrated return spring. The hub shifts automatically between low and high speed as the arms 43 retract and release the pawls 36 during the radial movement of the flyweights 19'.

Figure 8:
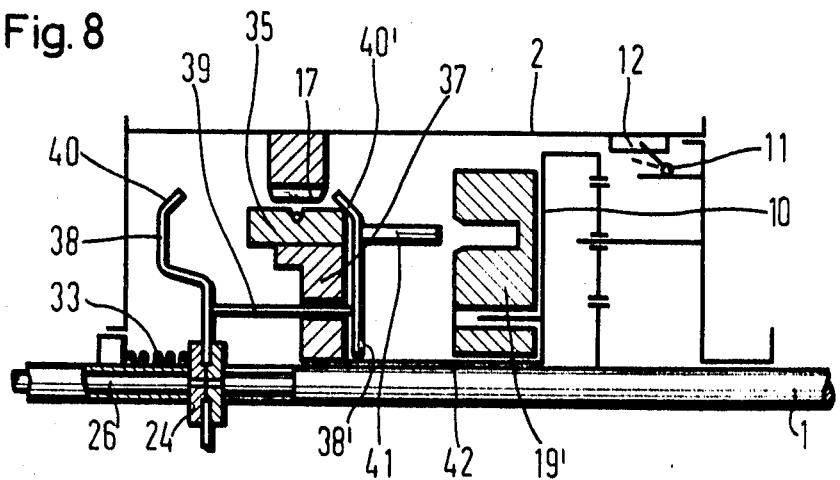
Figure 9:
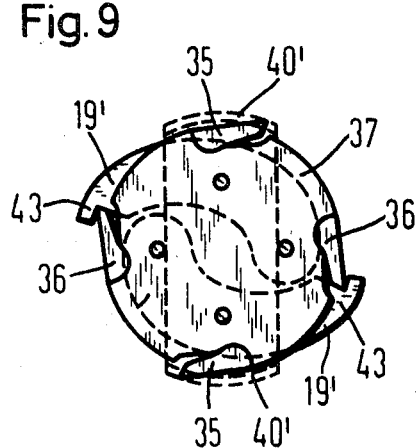
FIG. 9 illustrates the centrifugal governor and associated elements of the hub of FIG. 6 in fragmentary side elevation.

When it is desired to return to manual control, the slide 24 is shifted into one of the positions of FIGS. 6 and 5. Because of the fixed connection between the ring gear 10 and the pawl carrier 37, the pins 41 remain axially aligned with the recesses in the flyweights 19' in all positions of the latter. The orifices of the recesses flare conically in an outward, axial direction, as best seen in FIG. 8, so that the flyweights may be moved toward the hub shaft by camming engagement with the pins 41 if the change to manual shifting is made while the hub is automatically set for high-speed operation.

Figure 11:
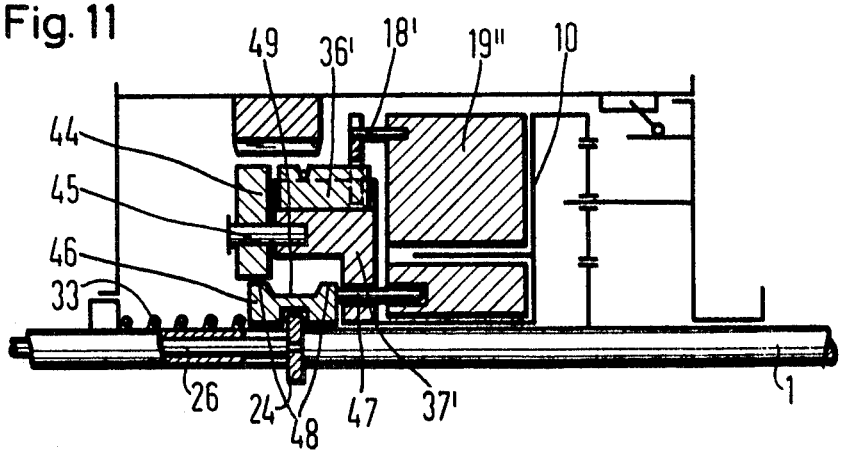
FIGS. 11 and 12 illustrate respective additional variants of the hub of the invention in the manner of FIG. 2.

The modified hub shown in FIG. 11 is similar to that described with reference to FIGS. 6 to 10 in that the two flyweights 19'' are axially interposed between the planetary gearing and a pawl carrier 37' which is fixedly fastened to the ring gear 10, the flyweights being pivoted to the ring gear for movement toward and away from the hub axis, and biased toward the hub axis by a return spring, not shown.

The pawl carrier 37' carries two pawls 36' diametrically opposite each other, only one being seen in the drawing, and an annular control disc 18' similar to the aforedescribed control disc 18. The pawls 36' extend into openings of the disc 18' and are held in the illustrated retracted position by cam faces of the disc 18' in the opening. The disc 18' is coupled to the flyweights 19'', and is turned on the pawl carrier 37' when the flyweights 19'' are swung away from the hub axis by centrifugal forces, thereby releasing the pawls 36' for engagement with a ratchet rim on the hub shell.

A second pawl 44 is mounted axially adjacent each pawl 36' on a pivot pin 45, and is biased toward engagement with the ratchet rim by a nonillustrated pawl spring in the usual manner. The slide 24 which may be moved axially on the hub shaft by a manual actuating mechanism, as described above, carries a ring 46 from which pins 47 axially extend into recesses of the flyweights 19'' to retain the flyweights near the hub axis in the illustrated condition of the hub.

The ring 46 has an outer face in which two annular cams 48 have axially opposite conical faces which bound a central groove 49. In the illustrated terminal position of the slide 24, the pin 47 is fully inserted in the recess of the flyweight, and the left cam 48 keeps the pawl 44 retracted. The hub is manually set for low speed, and the centrifugal governor is inactivated.

When the slide 24 is moved to the left until the groove 49 is aligned with the pawl 44, the pawl is released to engage the ratchet on the hub shell. The hub is manually set for high speed, and the pin 47 is partly withdrawn from the flyweight 19'', but not enough to permit automatic changes in the transmission ratio.

When the slide 24 is moved toward the left until the right cam 48 is aligned with the pawl 44, the pawl is disengaged from the ratchet rim, and the transmission ratio is automatically set by the flyweight 19'' which is released by the withdrawn pin 47.

Figure 12:
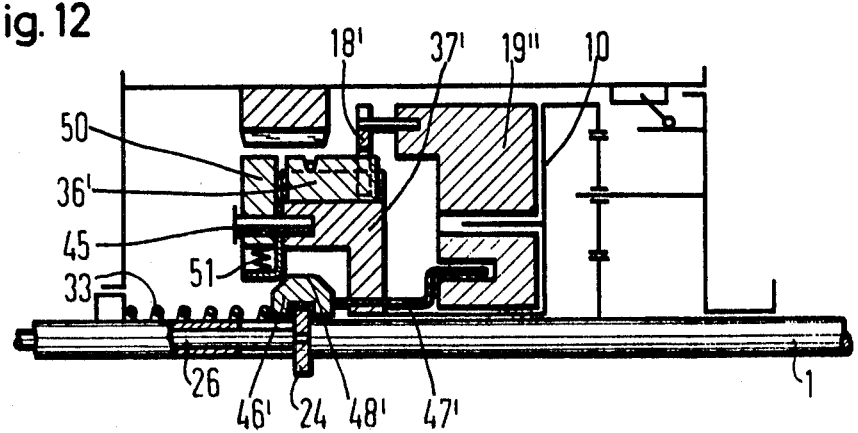

The embodiment of the invention shown in FIG. 12 is closely similar to that described with reference to that seen in FIG. 11. It is provided with a different, manually controlled pawl 50 which is of the type described and illustrated in more detail in my copending application Ser. No. 838,425, filed on July 2, 1969. The pawl is biased away from the associated ratchet rim by a spring 51, and the control ring 46' is accordingly provided with a single annular cam 48' having opposite conical flanks.

In the illustrated position of the slide 24, the pawl 36' is disengaged from the hub shell by the centrifugal governor which is blocked in its inoperative position, and the pawl 50 is retracted by its pawl spring 51. The hub is manually set for low speed. High speed is set manually when the pawl 50 is pivoted by the cam 48', and automatic operation is possible when the pin 47 is withdrawn from the flyweight 19'' while the pawl 50 is in its normal, disengaged position.

The multiple-speed hubs of the invention thus are provided with an automatic gear changing mechanism and with a manual override that can be set by the operator for a desired transmission ratio of the hub and inactivates the automatic mechanism. Only a single-actuating member is necessary for setting the several manual speeds and automatic operation, and the hub arrangement is correspondingly simple.

It should be understood, of course, that the foregoing description relates only to preferred embodiments of the invention, and that it is intended to cover all changes and modifications of the examples of the invention chosen for the purpose of the disclosure which do not constitute departures from the spirit and scope of the invention set forth in the appended claims.

What I claim is:

1. In a multiple-speed hub including a hub shell member mounted for rotation about an axis, a driver member rotatable about said axis, a multiple-speed transmission operatively interposed between said driver member and said hub shell member for rotating the hub shell member at a selected one of a plurality of speeds when said driver member rotates at a fixed speed, and centrifugal governor means including a flyweight coupled to one of said members for simultaneous rotation and mounted for movement in a path transverse to the direction of rotation in response to a change in the magnitude of centrifugal forces generated by said rotation, and automatic speed selecting means for selecting said one speed in response to said transverse movement of said flyweight, the improvement which comprises:
   a. manual speed-selecting means connected to said transmission for manually selecting said speed; and
   b. blocking means connected to said manual speed-selecting means and responsive to the manual selecting of said one speed for preventing movement of said flyweight in said transverse path during said change in said centrifugal forces.

2. In a hub as set forth in claim 1, a single-actuating member movably mounted on said hub shell, manually operable means for moving said actuating member, and motion transmitting means connecting said actuating member to said manual speed-selecting means and said blocking means.

3. In a hub as set forth in claim 1, said transmission including two transmission elements connected for simultaneous rotary movement about said axis at different speeds, and first and second coupling means engageable for coupling said transmission elements respectively to said hub shell member, said automatic speed-selecting means operatively connecting said flyweight to said first coupling means for engaging and disengaging the same when said flyweight reaches respective spaced positions in said transverse path thereof, said manual speed-selecting means including moving means for moving said flyweight in said path.

4. In a hub as set forth in claim 3, said moving means including a cam member mounted in said hub shell for axial movement, said flyweight being mounted in said hub shell, and said cam member engaging said flyweight during said axial movement thereof for moving the flyweight in said transverse path, said manual speed-selecting means including actuating means operatively connected to said cam member for moving the same axially.

5. In a hub as set forth in claim 4, said blocking means including a blocking member movable into and out of engagement with said flyweight for preventing movement of the same in said path in response to said change in centrifugal forces, and connecting means connecting said blocking member to said cam member for joint movement.

6. In a hub as set forth in claim 5, said blocking member being mounted in said hub shell for axial movement into and out of engagement with said flyweight, and said connecting means including a spring member axially interposed between said hub shell and one of said blocking and cam members.

7. In a hub as set forth in claim 6, said flyweight being formed with an axially open recess, and a portion of said blocking member moving inwardly and outwardly of said recess during axial movement of said blocking member.

8. In a hub as set forth in claim 7, rotating means for rotating said blocking member jointly with said flyweight and for thereby maintaining axial alignment of said portion of said blocking member with said recess during axial movement of said blocking member.

9. In a hub as set forth in claim 8, said rotating means including a wall axially projecting from said flyweight toward said blocking member adjacent said recess for circumferentially abutting engagement with said portion of the blocking member.

10. In a hub as set forth in claim 1, said transmission including two transmission elements connected for simultaneous rotary movement about said axis at different speeds, and first and second coupling means engageable for coupling said transmission elements respectively to said hub shell member, said automatic speed-selecting means operatively connecting said flyweight to said first coupling means for engaging and disengaging one of said transmission elements and said hub shell member in response to said movement of said flyweight in said transverse path, said manual-speed selecting means including third coupling means operatively interposed between said one transmission element and said hub shell member, and operating means for engaging and disengaging said third coupling means.

11. In a hub as set forth in claim 10, said operating means including two operating members connected for joint axial movement, in said hub shell member, said third coupling means being axially interposed between said operating members, and manually operated actuating means for axially moving said operating members between a first position in which one of said operating members disengages said third coupling means, a second position in which both operating members are spaced from said third coupling means, and a third position in which the other operating member disengages said third coupling means.

12. In a hub as set forth in claim 11, said blocking means including a blocking member connected to said operating members for joint axial movement and engaging said flyweight for preventing said movement of the flyweight in said transverse path when said operating members are in two of said three positions thereof.